(12) United States Patent
Tanaka et al.

(10) Patent No.: US 7,799,430 B2
(45) Date of Patent: Sep. 21, 2010

(54) CARBON COMMUTATOR AND PROCESS FOR PRODUCING THE SAME

(75) Inventors: Hiroaki Tanaka, Kiryu (JP); Hiroyuki Takayanagi, Isesaki (JP); Seiji Otake, Maebashl (JP); Mitsunari Ishizaki, Kiryu (JP)

(73) Assignee: Mitsuba Corporation, Kiryu-shi (JP)

( * ) Notice: Subject to any disclaimer, the term of this patent is extended or adjusted under 35 U.S.C. 154(b) by 0 days.

(21) Appl. No.: 12/224,311

(22) PCT Filed: Mar. 2, 2007

(86) PCT No.: PCT/JP2007/054009
§ 371 (c)(1),
(2), (4) Date: Aug. 22, 2008

(87) PCT Pub. No.: WO2007/102417
PCT Pub. Date: Sep. 13, 2007

(65) Prior Publication Data
US 2009/0011242 A1  Jan. 8, 2009

(30) Foreign Application Priority Data
Mar. 6, 2006 (JP) .............................. 2006-058897
Mar. 6, 2006 (JP) .............................. 2006-058898

(51) Int. Cl.
*B32B 9/00* (2006.01)
*H01R 43/06* (2006.01)

(52) U.S. Cl. ..................... 428/408; 428/469; 428/698; 428/702

(58) Field of Classification Search .............. 428/408, 428/698, 689, 699, 702, 323, 469, 472, 472.2; 310/237, 233, 236; 29/597, 598
See application file for complete search history.

(56) References Cited

U.S. PATENT DOCUMENTS

| 4,992,233 A | * | 2/1991 | Swaroop et al. ................ 419/2 |
| 5,175,463 A | | 12/1992 | Farago et al. |
| 2004/0013879 A1 | | 1/2004 | Tanaka et al. |

FOREIGN PATENT DOCUMENTS

| JP | A 61-130401 | 6/1986 |
| JP | A 08-308183 | 11/1996 |
| JP | A 09-046978 | 2/1997 |
| JP | A 2000-023425 | 1/2000 |
| JP | A 2002-338378 | 11/2002 |
| JP | A 2004-208398 | 7/2004 |
| JP | A 2005-041736 | 2/2005 |

OTHER PUBLICATIONS

G.I. Aksenov, et al., Oxidation of Iron Powders, Mar. 1974, Powder Metallurgy and Metal Ceramics, 13, pp. 185-188.*

* cited by examiner

*Primary Examiner*—Timothy M Speer
(74) *Attorney, Agent, or Firm*—Oliff & Berridge, PLC (57) ABSTRACT

A commutator utilizing a carbon composite base material, the carbon composite base material including a carbon base material; and an iron layer. The iron layer, to which a metal material can be joined, is formed on a surface of the carbon base material, iron powders, which are used to form the iron layer, are subjected to a treatment so as to increase surface-adsorbed oxygen before placing the iron powders to the surface of the carbon base material that is formed in advance by sintering, and sintering is applied to the iron powders placed on the surface of the carbon base material at a temperature not less than a diffusion temperature of carbon and not more than a melting point of iron in order to form the iron layer on the surface of the carbon base material.

8 Claims, 7 Drawing Sheets

| Iron powder treatment | Anti-peel strength (N) | Carbon residual ratio on iron layer side |
|---|---|---|
| Water immersion | 246.75 | About 70% |
| Heat treatment 1 | 174.17 | About 60% |
| Heat treatment 2 + Untreated | 322.45 | About 50% |
| Untreated | 165.85 | About 30% |

CARBON COMMUTATOR AND PROCESS FOR PRODUCING THE SAME

CROSS-REFERENCE TO RELATED APPLICATION

This application is the U.S. National Phase of PCT/JP2007/054009, filed Mar. 2, 2007, which claims priority from JP2006-058897 filed Mar. 6, 2006, and JP2006-058898 filed Mar. 6, 2006, the entire disclosures of which are incorporated herein by reference.

BACKGROUND

The present disclosure relates to a carbon commutator of an electric motor and a method for manufacturing the same.

There exists an in-tank fuel pump that is mounted onto a vehicle in which the fuel pump in itself is soaked (immersed) in the fuel. An inside of a housing that comprises the fuel pump serves as a flow channel of the fuel (such as gasoline). In this structure, each member that is incorporated in the fuel pump has to be made of a material with excellent fuel resistance in order to prevent a deterioration in functions due to erosion, etc., by the fuel.

As alternative fuels, alcohol (methanol or ethanol, etc.) or a mixed fuel that contains alcohol has been used in light of environmental protection. A conventional electric motor that is incorporated in a gasoline fuel pump uses a commutator segment of a commutator, with the commutator being made of copper. When alcohol fuel is directly applied to such gasoline fuel pump, copper portions of the commutator segment may be eroded by alcohol components of the alcohol fuel.

In order to prevent such an erosion by the alcohol fuel, a proposed commutator segment of a commutator comprises portions that are made of carbon (carbon base material), wherein the carbon portions are brought into sliding contact with a brush. A metal layer is formed on a side surface (a surface of a carbon base material) opposite to the brush sliding contact portions. On the metal layer, integrally formed (electrically joined) is a copper-made conductive terminal member (riser segment) (see U.S. Pat. No. 5,175,463, for example).

Surfaces of the carbon base material are so poor in wettability that most metal parts are hardly joined to the carbon base surfaces. In order to join a conductive terminal member to a carbon base material surface, for example, a metal layer has to be formed between the conductive terminal member and the carbon base material surface. In U.S. Pat. No. 5,175,463, a surface of the carbon base material is plated with nickel, etc. A conductive terminal member is joined to the plated surface by soldering, for example.

However, the metal layer that is formed by plating is easily peeled off. Although the metal layer and the conductive terminal member may integrally be joined to each other, the plated metal layer may be peeled off from the carbon base material surface, along with the conductive terminal member. The strength of such commutator may thus not be sufficiently secured. Durability of the commutator may also be insufficient.

There exists a proposed carbon base material to which a conductive terminal member is joined in advance by integrally sintering: carbon powders; metal powders that are arranged in a layer form relative to the carbon powders; and a conductive terminal member that is arranged at a side of the metal powders (see Japanese Published Unexamined Patent Application No. H8-308183, for example).

Because the carbon powders, the metal powders, and the conductive terminal member are integrally sintered, however, the sintering process is complicated and difficult to carry out. Sintering temperatures have to be set to temperatures that cause no deformation of the copper-made conductive terminal member. Such sintering temperatures also have to be lower than a melting point of the metal powders. Accordingly, sintering temperatures of the carbon base material may be limited.

If there are different shrinkage factors of the sintering between the metal powders and the carbon powders, then a gap may be easily formed between those two kinds of powders, which may soon be peeled off. In order to avoid such a problem, a carbon material has to be selected whose shrinkage factor is close to that of metal powders. Accordingly, the types of carbon material may be limited. In other words, carbon properties may be limited.

In order to solve the problem, iron powders are attached to a surface of the carbon base material, and the surface of the carbon base material is sintered at temperatures not less than diffusion temperatures of the carbon and not more than a melting temperature of the iron. Thus, formed is a functionally graded material that includes an iron layer that is integrally formed on the surface of the carbon base material. After that, the iron layer is joined to a commutator segment (copper-made plate member) by soldering, for example. As a result, a proposed material is manufactured such that the commutator segment and the carbon base material are electrically connected and integrated to each other (see Japanese Published Unexamined Patent Application No. 2002-338378, for example).

The proposed material is advantageous in that a carbon layer and a copper layer can be integrated by joining the iron layer to the copper-made commutator segment to be a commutator by soldering, for example. However, some carbon materials have lower sintering temperatures. For manufacturing the functionally graded material, if such a lower-sintering-temperature carbon material is used to produce a carbon composite base material, then a diffusion reaction hardly occurs between a binder carbonized component of the carbon material and the iron powders due to lower sintering temperatures.

In addition, a joint is not stable between the carbon and the iron powders, because a solid solution promotion, which corresponds to a carburizing reaction, may be prevented from being further promoted, thereby weakening (lowering) a joint strength between the iron layer and the carbon layer. As a result, a strength of the joint may be so low that the iron layer and the carbon layer may be peeled off from the joint by hand. In order to solve the problem, a proposed iron layer is an iron alloy layer containing a metal, such as chromium (Cr) or molybdenum (Mo), with a higher affinity with the carbon layer so as to increase an affinity with the carbon layer and an anti-peel strength (see Japanese Published Unexamined Patent Application No. 2004-208398, for example).

SUMMARY

The affinity between the iron alloy layer and the carbon layer is improved to some degree. However, when the iron alloy layer is joined to a copper plate or a brass plate by soldering, a clearance is easily formed between the plate and the iron alloy layer because the copper plate and the brass plate have a higher solder wettability than that of the iron alloy layer. The joint strength is thus not stable between the plate and the iron alloy layer. For a better wettability, a strong acidic flux can be used. However, use of such strong acid flux leads to not only an environmental problem but also a problem in losing a corrosion resistance because of such strong acidity. The present disclosure solves the problem as well as other problems and is also able to achieve various advantages.

The disclosure addresses an exemplary aspect of a commutator utilizing a carbon composite base material, the carbon composite base material includes a carbon base material; and an iron layer. The iron layer, to which a metal material can be joined, is formed on a surface of the carbon base material, iron powders, which are used to form the iron layer, are subjected to a treatment so as to increase surface-adsorbed oxygen before placing the iron powders to the surface of the carbon base material that is formed in advance by sintering, and sintering is applied to the iron powders placed on the surface of the carbon base material at a temperature not less than a diffusion temperature of carbon and not more than a melting point of iron in order to form the iron layer on the surface of the carbon base material.

In another exemplary aspect, there is provided a method for producing a commutator utilizing a carbon composite base material, the carbon composite base material including a carbon base material and an iron layer, wherein the iron layer, to which a metal material can be joined, is formed on a surface of the carbon base material, the carbon composite base material is formed by the steps of: placing iron powders, which are subjected to a treatment for increasing surface-adsorbed oxygen, to the surface of the carbon base material that is formed in advance by sintering; and sintering at a temperature not less than a diffusion temperature of carbon and not more than a melting point of iron in order to form the iron layer on the surface of the carbon base material.

In another exemplary aspect, the treatment for increasing the surface-adsorbed oxygen of the iron powders is either a water immersion treatment or a heat treatment.

In another exemplary aspect, there is provided a carbon commutator utilizing a carbon composite base material, the carbon composite base material includes a carbon base material; and an iron layer. The iron layer, to which a metal material can be joined by soldering, is formed on a surface of the carbon base material, iron alloy powders, which are used to form the iron layer, that contain metal powders for improving an affinity with carbon is placed on the surface of the carbon base material that is formed in advance by sintering, sintering is applied to the iron alloy powders placed on the surface of the carbon base material at a temperature not less than a diffusion temperature of carbon and not more than a melting point of iron in order to form the iron layer on the surface of the carbon base material, and the iron alloy powders further include copper-based metal material powders.

In another exemplary aspect, there is provided method for producing a carbon commutator utilizing a carbon composite base material, the carbon composite base material including a carbon base material and an iron layer, wherein the iron layer, to which a metal material can be joined, is formed on a surface of the carbon base material, the carbon composite base material is formed by the steps of: placing iron alloy powders, which contain metal powders and copper-based metal material powders for improving an affinity with carbon, to the surface of the carbon base material that is formed in advance by sintering; and sintering at a temperature not less than a diffusion temperature of carbon and not more than a melting point of iron in order to form the iron layer on the surface of the carbon base material.

In another exemplary aspect, the copper-based metal material powders are copper powders or selected among alloy powders of copper and other metals.

According to various exemplary aspects of the disclosure, by using the iron powders that are subjected to the treatment for increasing the surface-adsorbed oxygen, a reaction is facilitated at a contact interface between the carbon base material and the iron powders, thereby providing a carbon commutator with a greater anti-peel strength.

According to various exemplary aspects of the disclosure, the treatment can easily be applied for increasing the surface-adsorbed oxygen.

According to various exemplary aspects of the disclosure, a solder wettability is improved because the iron alloy layer contains the copper-based metal material. As a result, a carbon composite base material can be provided with an improved anti-peel strength as the copper-based metal is soldered to the iron alloy layer.

According to various exemplary aspects of the disclosure, the copper-based metal material to be contained in the iron alloy layer can easily be obtained.

BRIEF DESCRIPTION OF THE DRAWINGS

An embodiment of the present disclosure will be described with reference to the drawings, wherein.

DETAILED DESCRIPTION OF EMBODIMENTS

Figure 1:
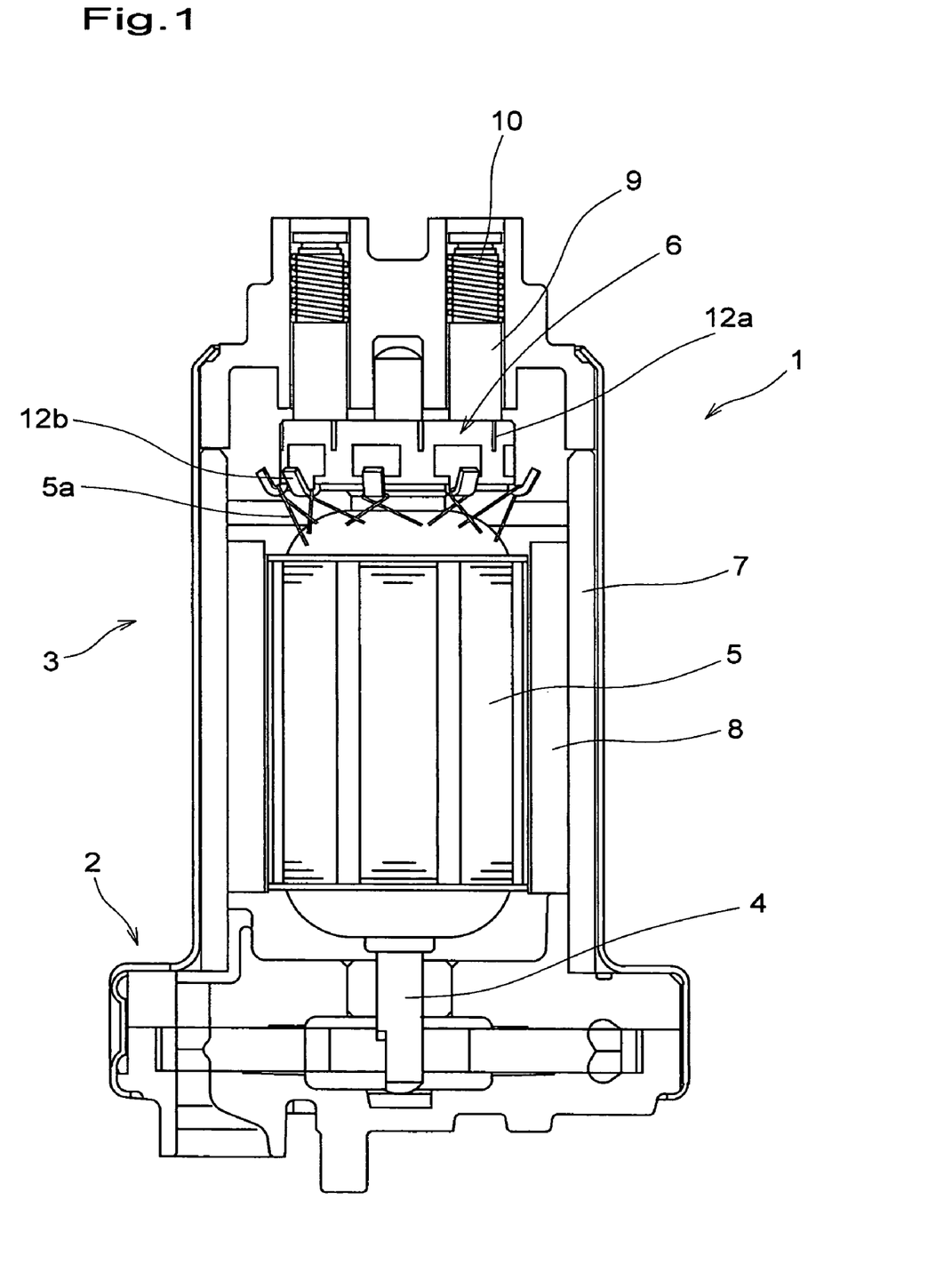
FIG. 1 is a longitudinal sectional view of a fuel pump.

Next, an embodiment of the present disclosure will be described with reference to the drawings. In FIG. 1, reference numeral 1 denotes a fuel pump for supplying to an internal combustion a mixed fuel in which methyl alcohol is mixed into gasoline. The fuel pump 1 comprises a pump portion 2 and a motor portion 3 (see FIG. 1). In the present embodiment, the pump portion 2 employs a general-purpose impeller type pump to be provided on a rotor shaft 4, which is described later. A description of the impeller type pump is omitted. In the motor portion 3, the rotor shaft 4 is integrally provided with a rotor core 5 and a commutator (carbon commutator) 6 (see FIG. 1), which is described later. A permanent magnet 8 is fixed on an inner peripheral surface of a yoke 7. A brush 9 that comes into sliding contact with the commutator 6 is urged by a spring 10 (see FIG. 1). One side surface of the commutator 6 in an axial direction of the rotor shaft 4 has a sliding contact surface that comes into sliding contact with the brush 9.

Figure 2:
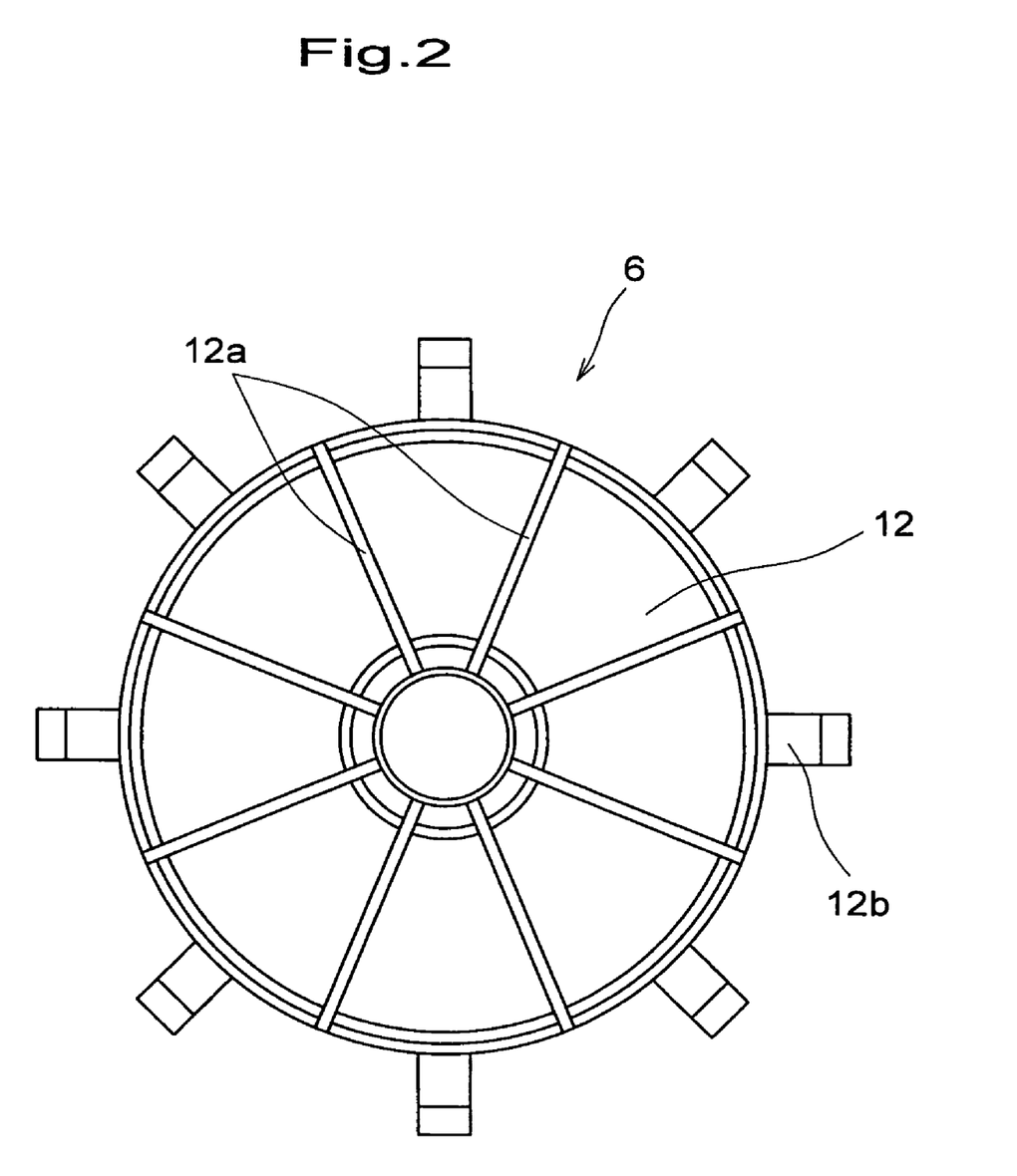
FIG. 2 is a front view of a commutator.
Figure 3:
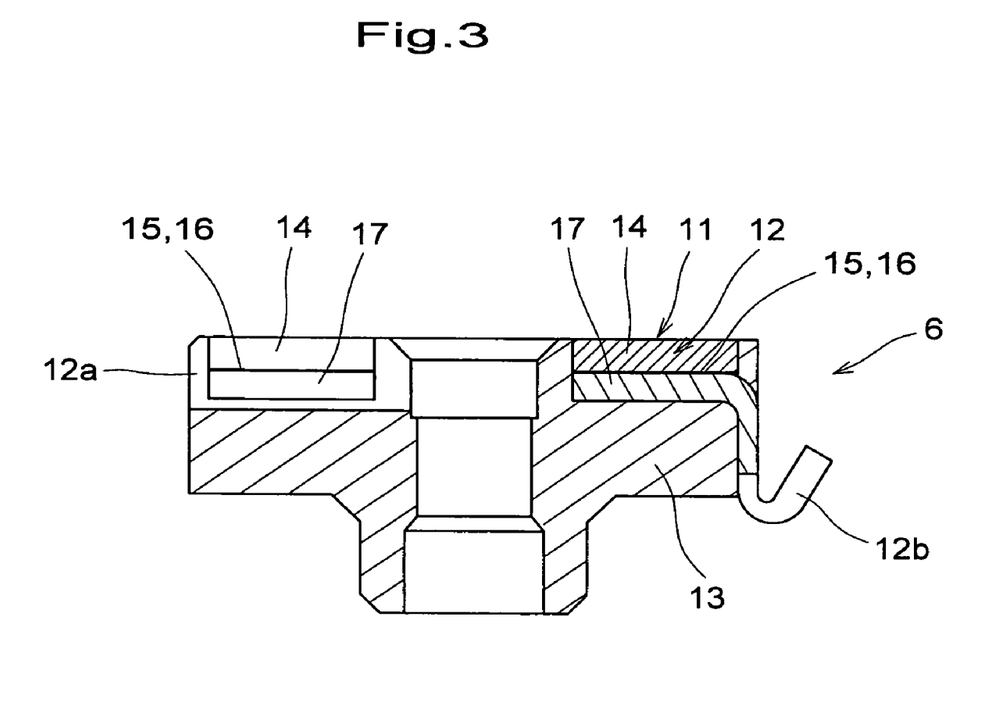
FIG. 3 is a longitudinal sectional view of the commutator.

The commutator 6 is structured such that a commutator segment 12 is formed by using a carbon composite base material 11 (see FIG. 3) with which the present embodiment is carried out. For the carbon composite base material 11, the commutator 6 is integrally formed by injection-molding a resin material 13 made of an insulating material while being penetrated by the rotor shaft 4. As shown in FIG. 3, cut grooves 12a are radially formed at one side surface of the commutator segment 12 so that multiple commutator segments 12 are circumferentially provided so as to be electrically disconnected. A riser 12b is projectingly formed on each of the commutator segments 12 (see FIGS. 1 and 2). A coil 5a is wound around the rotor core 5, then hooked on the riser 12b (see FIG. 1).

For the carbon composite base material 11 that forms the commutator 6 of the present disclosure, iron powders are subjected to a heat treatment or a water immersion treatment, placed on a surface of a carbon base material 14 that is formed in advance by sintering, and gradually heated at temperatures higher than a solid solution temperature (a diffusion temperature) of carbon. As a result, a solid solution that corresponds to a carburizing reaction occurs efficiently on the carbon base material 14, even if the solid solution temperature of the carbon base material 14 is lower. An iron layer 15 is thus formed in the commutator 6 with a greater anti-peel strength.

Because the water immersion treatment or the heat treatment is applied to the iron powders, an oxidation reaction can advance on surfaces of the iron powders. A large amount of active oxygen can thus be adsorbed to the surfaces of the iron powders. On the carbon base material 14, the active oxygen can thus promote a solid solution corresponding to a carburizing reaction. As a result, an anti-peel strength can be increased between the carbon base material 14 and the iron. Water used for such water immersion treatment of the iron powders is required to contain dissolved oxygen in order to facilitate oxidization on the iron powder surfaces.

When iron with a lower amount of carbon under a carbon atmosphere is heated at a temperatures not less than approximately 800 degrees Celsius, which is higher than a solid solution temperature of carbon, then a so-called carburizing reaction occurs, in which the carbon diffuses to surfaces of iron materials so as to cause a solid solution. In the case where this carburizing reaction is caused, a greater joint strength can be achieved if metal powder, containing other metals whose main component is iron instead of the above-described iron powders, is sintered on the surfaces of the carbon base material 14. When the anti-peel strength was measured, the carbon base material 14 was broken before a joined surface was peeled off, where an anti-breaking strength of the carbon base material was approximately 200 kgf/cm2 (kilogram-force per squire centimeter). The joint strength thus is proven to pose no problem in practical use.

Furthermore, the carbon base material 14 is formed such that, for example, carbon powders are compacted into a shape (a ring shape, for example); the compacted formed carbon powders (that is, a carbon base material) is sintered for 2 hours at temperatures of 800 to 2000 degrees Celsius; and the sintered carbon base material is cooled off at a normal temperature (a room temperature). Sintering hours and temperatures for forming the carbon base material 14 are based on conditions appropriately set accordingly to a use of the carbon base material 14. After that, the iron powders, subjected to the water immersion treatment or the heat treatment, are attached on an upper surface of the carbon base material 14 formed as described above. Here, various methods are used for attaching the iron powders to the upper surface of the carbon base material 14. For example, a proper amount of iron powders can directly be placed on the upper surface of the carbon base material 14, and can then be leveled with a spatula or the like. Or, iron powders can forcibly be attached by using a binder (for example, an organic adhesive), the binder being burned and vanished at a temperature rising phase during the sintering.

Figure 4:
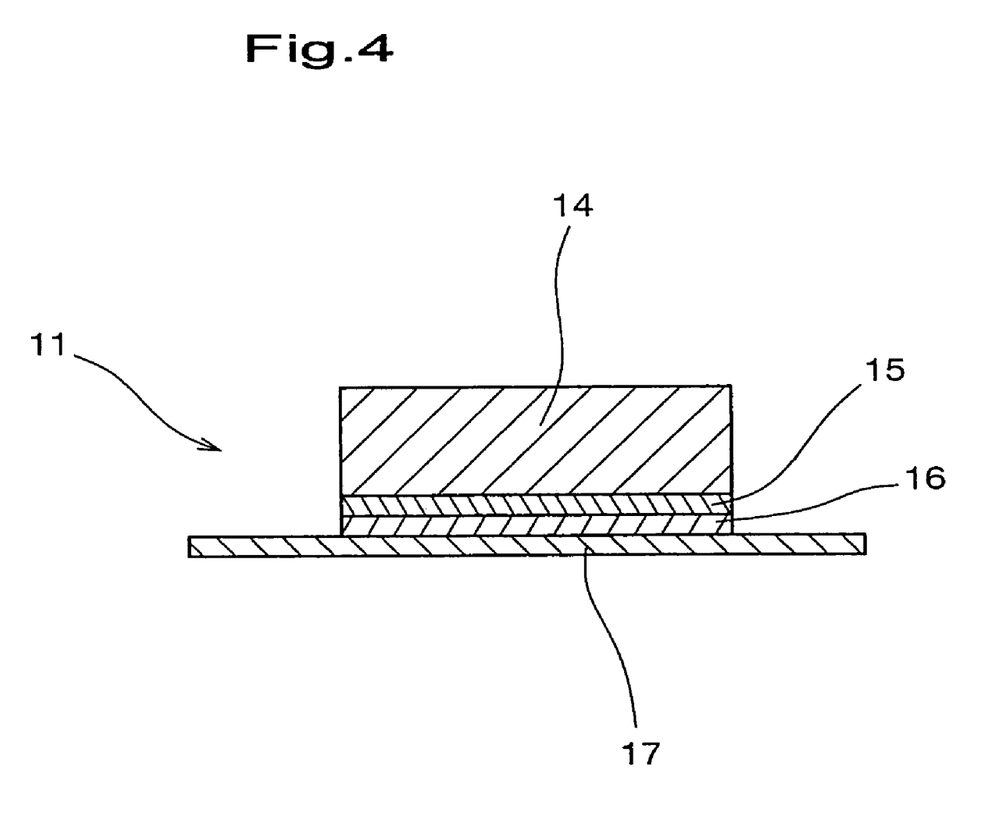
FIG. 4 is a longitudinal sectional view showing a schematic state of a carbon composite base material and a copper plate soldered to each other.

A particle size of the iron powders is each approximately 5 to 15 micrometers (μm), preferably, 10 μm on average. Sintering temperatures are 1000 to 1300 degrees Celsius, which is higher than a diffusion temperature of carbon (not less than a diffusion temperature) and lower than a melting point of iron (not more than a melting point), and preferably approximately 1100 to 1150 degrees Celsius. Sintering time is 1 to 2 hours, and preferably approximately 1.5 hours. A sintering atmosphere is preferably a vacuum atmosphere, which should not be limited to only such an atmosphere. These conditions being set, the carbon composite base material 11 is formed so as to have the iron layer 15 on a surface of the carbon composite base material 11. Accordingly, the carbon composite base material 11 formed as described above can be used for various purposes as a so-called functionally graded material that allows, for example, a copper plate 17 to be fixed to the iron layer 15 by soldering with a solder 16 (see FIGS. 3 and 4).

In addition, the carbon composite base material 11 manufactured in accordance with the present disclosure has a sintered iron alloy layer that is formed on a surface of the carbon base material 14 to which such metal materials as copper and brass can be joined by soldering. Metals other than iron that forms the iron alloy layer have a high affinity (compatibility) with carbon. Such metals are exemplified in Group 4, Group 5, Group 6, Group 7, Group 9, and Group 10 elements of a long periodic table of elements. Of those exemplified metals, one or a plurality of metals are selected. Specifically, such metals are titanium (Ti), vanadium (V), chromium (Cr), manganese (Mn), cobalt (Co), nickel (Ni), niobium (Nb), molybdenum (Mo), and tungsten (W). One or a plurality of those specified metals are thus selected.

As the iron alloy, a mixture of powders of a single metal may be used. In light of evenness of the iron alloy layer to be sintered, however, powders of an iron alloy that contains the above-descried selected metals are more preferable. As such an alloy, exemplified are alloys of stainless steel, chromium steel, nickel-chromium steel, or nickel-chromium-molybdenum steel, etc. Either a single one or a combination of two or more kinds of those alloys may be used.

A content rate of a metal other than iron is around 1 to 40 percent. For example, when a metal is stainless steel, the stainless steel SUS304L, as being named by a Japanese Industrial Standards (JIS), is an iron alloy that contains metals of manganese in 0.2%, nickel in 10.0%, and chromium in 19.2%. That is the total proportion of these metals is 29.4%. SUS316L is an iron alloy that contains metals of manganese in 0.4%, nickel in 13.0%, chromium in 17.0%, molybdenum in 3.0%, and niobium in 0.4%. That is the total proportion of these metals is 31.1%. SUS444L is an iron alloy containing the metals of manganese in 0.2%, nickel in 0.2%, chromium in 18.0%, and molybdenum in 2.0%. That is the total proportion of these metals is 20.4%. When an iron alloy is chromium-molybdenum steel, SCM415, as being named by JIS, contains manganese in 0.6%, chromium in 1.0%, and molybdenum in 0.3%. That is the total proportion of these metals is 1.9%. In the present disclosure, those iron alloys above can be adopted.

In order to improve a wettability of the solder 16 for joining to the copper plate 17, a copper-based metal material is contained in the above-specified iron alloy. As a copper-based metal material to be contained, not only a single copper can be adopted, but also a copper alloy that contains copper and other metals, that is, one or a plurality of kinds selected among various copper alloys can be adopted. For example, adopted are brass being an alloy of copper and zinc (Zn); bronze being an alloy of copper and tin (Sn); aluminum bronze being an alloy of copper and aluminum (Al); beryllium bronze being an alloy of copper and beryllium (Be); cupronickel being an alloy of copper and nickel; nickel silver being an alloy of copper, nickel, and zinc.

A particle size of the metal powders to be used is each approximately 5 to 30 μm, and an average of the particle size is approximately 10 μm. Sintering temperatures are 1000 to 1300 degrees Celsius, and preferably 1050 to 1150 degrees Celsius, which is higher than a diffusion temperature of carbon (not less than a diffusion temperature) and lower than a melting point of iron (not more than a melting point). A sintering time is approximately 0.5 to 2 hours, and preferably approximately 1.5 hours. A sintering atmosphere is preferably a vacuum atmosphere, which should not be limited to only such an atmosphere. These conditions being set, the carbon composite base material 11 is formed so as to have a copper-containing iron layer 15 that is formed on a surface of the carbon base material 14 (see FIG. 3). The carbon composite base material 11 can be used for various purposes as a so-called functionally graded material. A commutator can thus be produced, for example, by joining a copper-made commutator segment 12 to a surface of the copper-containing iron layer 15 by using soldering with a solder 16.

Water- and heat-treated iron powders and various carbon composite base materials were produced experimentally. Results of the experimental productions are shown in a table of FIG. 5 and a graph of FIG. 7.

I. Production of Water-Treated Iron Powders

Iron powders with an average particle size of 10 micrometers were immersed for 20 hours in distilled water that had been subjected to aeration. Then, the immersed iron powders were filtrated. After that, the filtrated iron powers were dried at a normal temperature. As a result, water-treated iron powders were obtained (see FIG. 5).

II. Production of Heat-Treated Iron Powders

Other iron powders with an average particle size of 10 micrometers were subjected to a heat treatment for 1 hour at temperatures of 200 degrees Celsius and 500 degrees Celsius respectively in the air, then were naturally cooled off to a normal temperature. As a result, heat-treated iron powders 1 and 2 were each obtained (see FIG. 5).

III. Production of Various Carbon Composite Base Materials

Various carbon composite base materials 11 were produced by placing the above obtained treated iron powders on surfaces of carbon base materials 14 that had been sintered for 2 hours at temperatures of 1400 degrees Celsius. The water-treated iron powders and the heat-treated iron powders 1 were leveled to a thickness of about 0.1 millimeters before being placed on a carbon base material 14 surface, then were sintered for 1.5 hours at temperatures of approximately 1100 degrees Celsius under a vacuum atmosphere. As a result, carbon composite base materials 11 were respectively obtained (see FIG. 5).

Regarding the heat-treated iron powders 2, mixed iron powders were used containing untreated iron powders in 75% and the heat-treated iron powders 2 in 25% so that another carbon composite base material 11 was obtained in the same manner as described above. In addition, for comparison, another carbon composite base material 11 was obtained in the same manner by using untreated iron powders without any water- or heat-treated iron powders (see FIG. 5).

Figure 5:
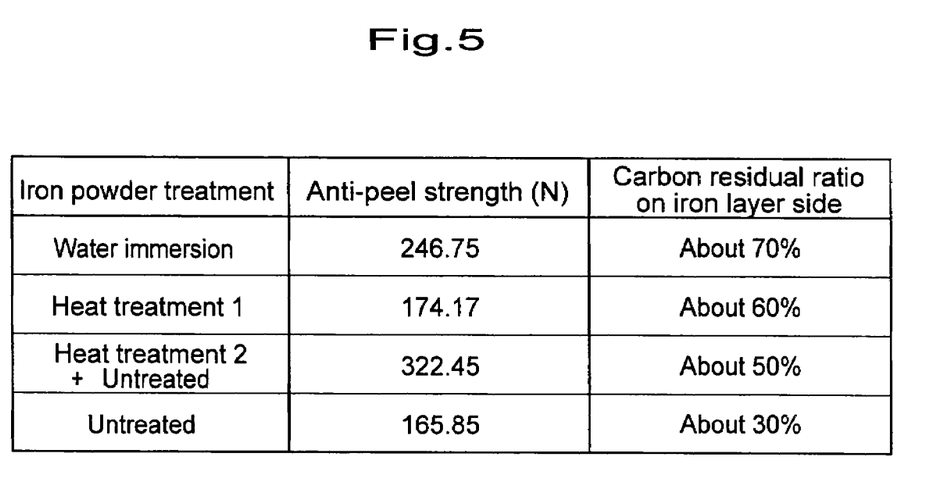
FIG. 5 is a table showing measured results of anti-peel strengths of the carbon composite base materials.

As shown in the table of FIG. 5, those produced carbon composite base materials 11 were measured for anti-peel strengths (N). Conditions of peeled surfaces of those carbon composite base materials 11 were also observed. The carbon composite base materials 11 produced by using the water- or heat-treated iron powders are all improved in anti-peel strengths in comparison with the carbon composite base material 11 using untreated iron powders. The carbon composite base materials 11 using the water- or heat-treated iron powders are also all improved in carbon base material residual percentages at sides of copper-made terminal members.

IV. Production of Other Carbon Composite Base Materials

Iron alloy powders of SUS444L with an average particle size of 10 micrometers were sufficiently mixed with copper powders with an average particle size of 10 micrometers so that copper powder proportions with 3, 7.5, and 15 percentages respectively by weight (wt %) with respect to the iron alloy powders of SUS444L. After that, each of the mixed iron alley powers with the copper powers was placed and leveled to a thickness of approximately 0.5 millimeters on surfaces of carbon base materials 14, which had been sintered for 2 hours at temperatures of 1400 degrees Celsius, then were sintered for 1.5 hours at sintering temperatures of 1100 degrees Celsius under a vacuum atmosphere. As a result, obtained materials comprised a copper-containing iron layer 15 and a carbon base material 14 that were integrally joined to each other. A thickness of the copper-containing iron layer 15 of those materials was approximately 200 micrometers on average.

Figure 6:
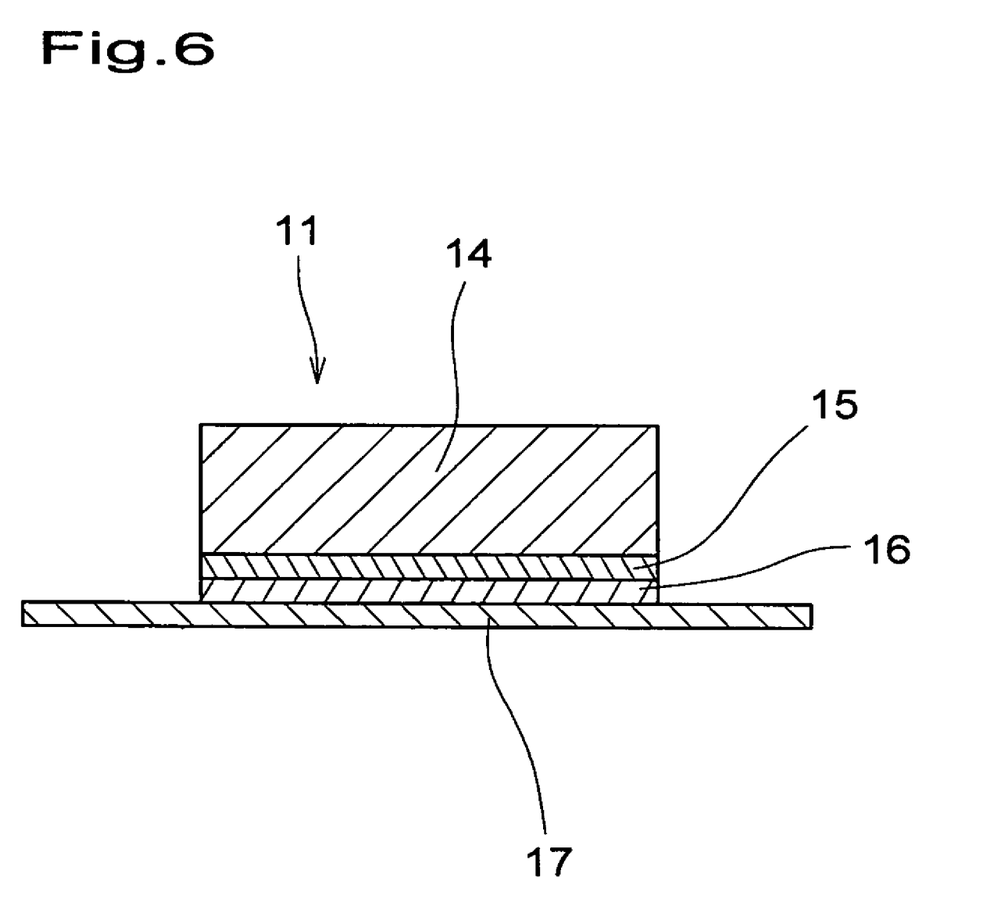
FIG. 6 is a longitudinal sectional view showing a schematic state of another example of a carbon composite base material and a copper plate soldered to each other.
Figure 7:
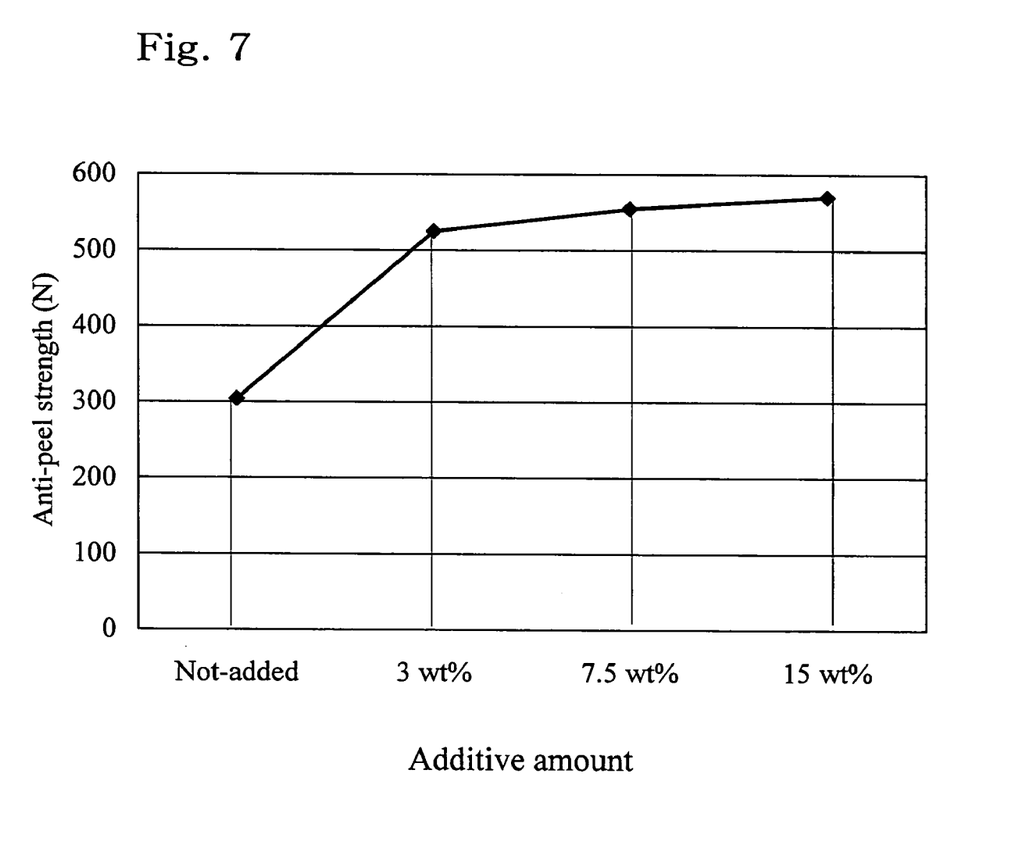
FIG. 7 is a graph showing measured results of anti-peel strengths of the carbon composite base material illustrated in FIG. 6.

A copper plate 17 was joined to the copper-containing iron layers 15 by the solder 16 (see FIG. 6). As shown in the graph of FIG. 7, joint strengths (anti-peel strengths N) thereof were representatively measured. The iron alloys mixed with the copper-based metal materials are all improved in joint strength in comparison with the iron alloy to which no copper-based metal materials are mixed.

The present disclosure is useful for a carbon commutator of an electric motor and a method for producing the same. An iron powder subjected to a water immersion treatment or a heat treatment for increasing surface-adsorbed oxygen is attached to the surface of the carbon base material formed in advance by sintering. A carbon composite base material is formed by applying sintering at temperatures not less than the diffusion temperature of carbon and not more than the melting point of iron. Reaction is promoted at the contact interface between the carbon base materials and the iron powders. As a result, a commutator is obtained with a high anti-peel strength.

What is claimed is:

1. A commutator utilizing a carbon composite base material, the carbon composite base material comprising:
   a carbon base material; and
   an iron layer, wherein:
      the iron layer, to which a metal material can be joined, is formed on a surface of the carbon base material,
      iron powders, which are used to form the iron layer, are subjected to a treatment so as to increase surface-adsorbed oxygen before placing the iron powders to the surface of the carbon base material that is formed in advance by sintering, and
      sintering is applied to the iron powders subjected to the treatment so as to increase surface-adsorbed oxygen and placed on the surface of the carbon base material at a temperature not less than a diffusion temperature of carbon and not more than a melting point of iron in order to form the carbon composite base material having the iron layer on the surface of the carbon base material.

2. The commutator of claim 1, wherein the treatment for increasing the surface-adsorbed oxygen of the iron powders is either a water immersion treatment or a heat treatment.

3. The commutator of claim 1, wherein:
   the iron powders are iron alloy powders, which are used to form the iron layer, that contain metal powders for improving an affinity with carbon are placed on the surface of the carbon base material that is formed in advance by sintering, and the iron alloy powders further include copper-based metal material powders.

4. The carbon commutator of claim 3, wherein the copper-based metal material powders are copper powders or selected among alloy powders of copper and other metals.

5. A method for producing a commutator utilizing a carbon composite base material, the carbon composite base material comprising a carbon base material and an iron layer, wherein the iron layer, to which a metal material can be joined, is formed on a surface of the carbon base material, the carbon composite base material is formed by the steps of:

placing iron powders, which are subjected to a treatment for increasing surface-adsorbed oxygen, to the surface of the carbon base material that is formed in advance by sintering; and sintering the iron powders subjected to the treatment for increasing surface-adsorbed oxygen at a temperature not less than a diffusion temperature of carbon and not more than a melting point of iron in order to form the carbon composite base material having the iron layer on the surface of the carbon base material.

6. The method for producing the commutator of claim 5, wherein the treatment for the increasing the surface-adsorbed oxygen of the iron powder is either a water immersion treatment or a heat treatment.

7. The method for producing the carbon commutator of claim 5, wherein the iron powders are iron alloy powders, which contain metal powders and copper-based metal material powders for improving an affinity with carbon, that are placed to the surface of the carbon base material that is formed in advance by sintering.

8. The method for producing the carbon commutator of claim 7, wherein the copper-based metal material powders are copper powders or selected among alloy powders of copper and other metals.

* * * * *